United States Patent [19]
Smith

[11] Patent Number: 5,887,319
[45] Date of Patent: Mar. 30, 1999

[54] SELF ADJUSTING SPRING FASTENER

[76] Inventor: Edward John Smith, 260 Lely Beach, #301, Bonita Springs, Fla. 33923

[21] Appl. No.: 943,879

[22] Filed: Oct. 3, 1997

Related U.S. Application Data

[60] Provisional application No. 60/028,089 Oct. 7, 1996.

[51] Int. Cl.⁶ .................................................. A44B 17/00
[52] U.S. Cl. .................................. 24/293; 24/458; 24/289
[58] Field of Search ............................. 24/289, 293, 295, 24/297, 458, 292; 403/403, 205; 411/913

[56] References Cited

U.S. PATENT DOCUMENTS

| | | | |
|---|---|---|---|
| 2,178,719 | 11/1939 | Cotter | 24/293 |
| 2,322,656 | 6/1943 | Murphy | 24/293 |
| 2,329,688 | 9/1943 | Bedford, Jr. | 24/458 X |
| 2,607,971 | 8/1952 | Bedford, Jr. | 24/458 X |
| 2,825,948 | 3/1958 | Parkin | 24/458 X |
| 3,673,643 | 7/1972 | Kindell | 24/458 |
| 3,864,789 | 2/1975 | Leitner | 24/293 |
| 4,609,170 | 9/1986 | Scmnabi | 24/458 X |
| 5,373,611 | 12/1994 | Murata | 24/289 X |
| 5,442,789 | 8/1995 | Fisher et al. | 24/295 X |
| 5,542,158 | 8/1996 | Gronau et al. | 24/289 X |

*Primary Examiner*—Anthony Knight
*Assistant Examiner*—Robert J. Sandy
*Attorney, Agent, or Firm*—E. Vassiliou

[57] ABSTRACT

A self adjusting spring fastener for securing one sheet of material on another sheet of material having a clip member with inwardly extended barbs, and one clip with outwardly extended barbs, or outwardly ribs or embosses, or a combination of both outwardly extended barbs and outwardly extended ribs or embosses.

9 Claims, 4 Drawing Sheets

SELF ADJUSTING SPRING FASTENER

CROSS REFERENCE TO RELATED APPLICATIONS

This application claims priority from U.S. Provisional Application No. 60/028,089, filed Oct. 7, 1996, which application is incorporated herein by reference in its entirety.

FIELD OF THE INVENTION

This invention relates to spring fasteners, and more particularly to those fasteners characterized by quick and variable lock mechanisms.

BACKGROUND OF THE INVENTION

A number of fasteners have been used in the past for securing one object on another object, as for example, securing an article such as a plastic sheet on a metal or other plastic sheet. However, the fasteners being used presently are particularly designed for only a limited number of matching objects to be secured on each other. The problem becomes more severe when a secondary sheet, a rubber sheet for example, is supported on the other metal or plastic sheet.

SUMMARY OF THE INVENTION

The instant invention is directed to spring fasteners characterized by quick and variable lock mechanisms. More particularly, the instant invention pertains to a fastening device comprising in combination an assembly of a first clip and a second clip, the first clip integrally connected to the second clip, the first clip comprising inwardly extended barbs, and the second clip comprising outwardly extended barbs, ribs or embosses, and two sides. This combination of inwardly extended barbs, or ribs, or embosses on the first clip with the outwardly extended barbs, ribs or embosses on the second clip provide an outstanding versatility to the use of the spring fastener as described hereinbelow.

Preferably, the assembly of the first clip and the second clip are made of sheet metal having a thickness, more preferably in the range of 0.005" to 0.060".

The first clip may preferably comprise two clip members disposed above the sides of the second clip. The first clip may further comprise a flat portion disposed above the second clip and inbetween the two sides of the second clip.

DESCRIPTION OF THE DRAWING.

The reader's understanding of practical implementation of preferred embodiments of the invention will be enhanced by reference to the following detailed description taken in conjunction with perusal of the drawing figures, wherein.

DETAILED DESCRIPTION OF THE INVENTION

The instant invention is directed to spring fasteners or fastening devices characterized by quick and variable locking mechanisms.

Figure 1:
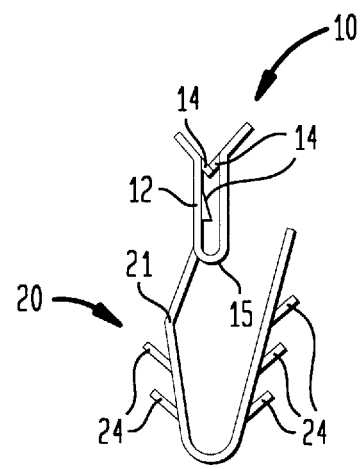
FIG. 1 is a schematic diagram showing a side view of a spring fastener according to a preferred embodiment of this invention, wherein the spring fastener has outwardly extending barbs.
Figure 2:
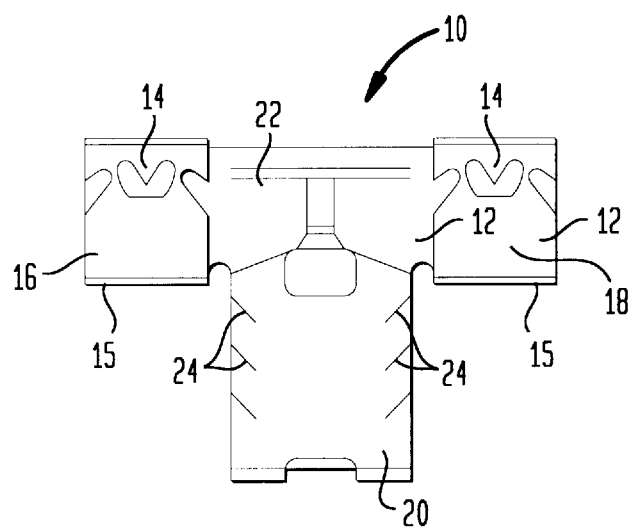
FIG. 2 shows a front view of the spring fastener of FIG. 1.

Referring now to FIGS. 1 and 2, there is depicted a spring fastener 10 according to a preferred embodiment of the instant invention. FIG. 1 shows a side view of the spring fastener 10, while FIG. 2 shows a front view of the same spring fastener 10. The spring fastener 10 comprises a first spring clip, which is preferably a double spring clip 12, which preferably has two side clip members 16 and 18 disposed above a second clip 20 of the spring fastener 10.

The first clip, in addition to the two side clip members 16 and 18, also has a flat portion 22, which is above the second clip 20 connecting the side clip members 16 and 18. The first clip also has barbs 14, extending or directed inwardly, preferably disposed on the side clip members, which however may also be disposed on the flat portion. The first clip also has a bottom 15.

The second spring clip has barbs 24 extending or directed outwardly, and a bent 21.

Figure 3:
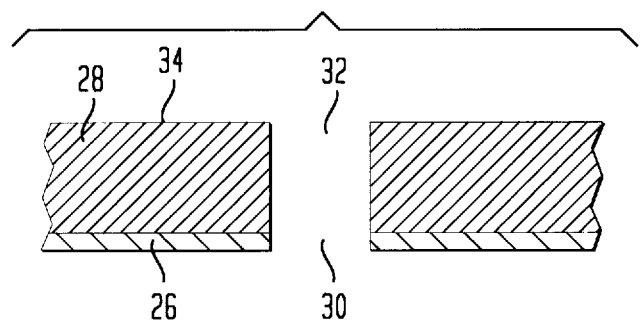
FIG. 3 shows an example of a metal or plastic sheet covered by a resilient sheet, which may be rubber, carpet, or any other resilient material, for example.
Figure 4:
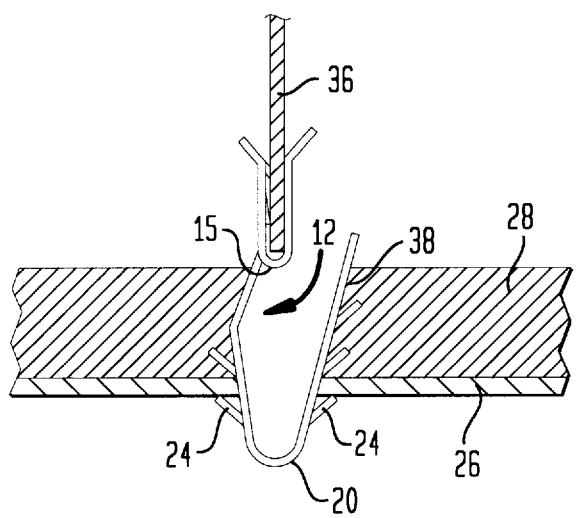
FIG. 4 is a schematic representation of an example of a spring fastener of the present invention, wherein the sheet assembly of FIG. 3 has been fastened to another sheet, such as a plastic sheet, for example.

The operation of this embodiment may be better understood by considering FIGS. 3 and 4. FIG. 3 depicts a first object comprising a rigid plastic or metal sheet 26, for example on which rigid plastic or metal 26 there is disposed a resilient sheet 28, which may be a carpet or a rubber mat, for example. The rigid sheet 26 has an opening 30. Similarly, the resilient sheet 28 has an opening 32, which is shown in FIG. 3 to have similar dimensions as the opening 30 of the rigid sheet 26. However, the opening 32 may be of different dimensions, and preferably of smaller dimensions.

In operation, the spring fastener is inserted and pushed through the openings 32 and 30, as better shown in FIG. 4, until the bottom 15 reaches the top portion 34 of the resilient sheet 28, or until the resilient sheet 28 is compressed to a desired degree by the bottom 15 of the first clip 12 in a manner that the bottom 15 reaches a position lower than the top portion 34. The spring fastener 12 is then released. When the spring fastener is released, the pair of outwardly extending barbs 24, which happens to be closest and under the rigid sheet firmly engages to the rigid sheet and secures the spring fastener 10 in position.

In turn, another object, such as sheet 36 for example, is inserted into the first clip, and engages to said first clip with the help of the inwardly extending or directed barbs 14.

When the spring fastener is to be taken out of the engagement with the assembly 26 and 28, the free side 38 is compressed against the first clip 12, and the spring fastener is pulled out, since the barbs 24, due to the compressed configuration, do not engage to the rigid sheet 26.

Figure 5:
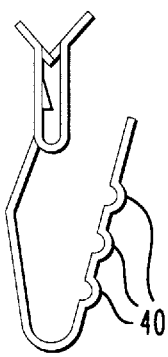
FIG. 5 is a schematic diagram showing a side view of a spring fastener according to another preferred embodiment of this invention, wherein the spring fastener has outwardly extending ribs or embosses in place of the barbs.
Figure 6:
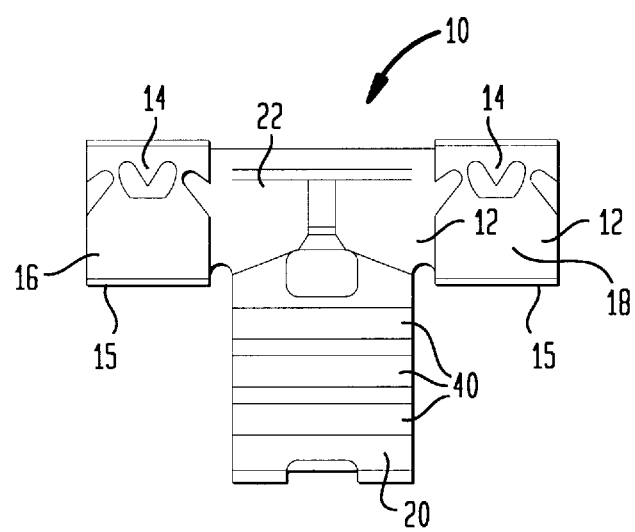
FIG. 6 shows a front view of the spring fastener of FIG. 5.

In another embodiment of the instant invention, better shown in FIGS. 5 and 6, the barbs are replaced by ribs or embosses 40.

In operation, the spring fastener is inserted and pushed through the openings 32 and 30, as better shown in FIG. 4, until the bottom 15 reaches the top portion 34 of the resilient sheet 28, or until the resilient sheet 28 is compressed to a desired degree by the bottom 15 of the first clip 12 in a manner that the bottom 15 reaches a position lower than the top portion 34. The spring fastener 12 is then released. When the spring fastener is released, the outwardly extending rib or emboss 40, which happens to be closest and under the rigid sheet firmly engages to the rigid sheet and secures the spring fastener 10 in position.

In turn, another object, such as sheet 36 for example, is inserted into the first clip, and engages to said first clip with the help of the inwardly extending or directed barbs 14.

When the spring fastener is to be taken out of the engagement with the assembly 26 and 28, the free side 38 is compressed against the first clip 12, and the spring fastener is pulled out, since the ribs or embosses 40, due to the compressed configuration, do not engage to the rigid sheet 26.

Figure 8:
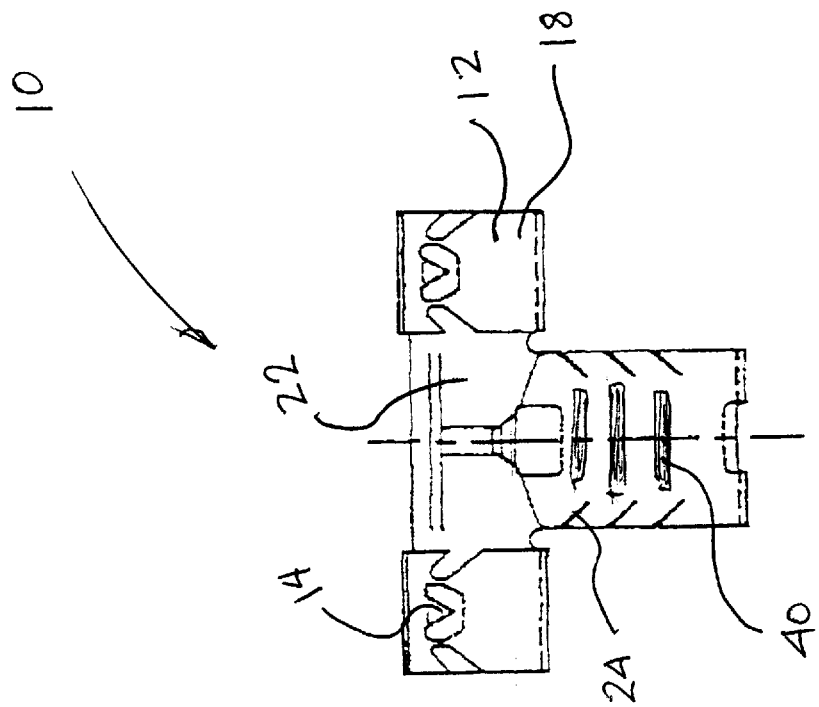
FIG. 8 shows a front view of the spring fastener of FIG. 7.
Figure 7:
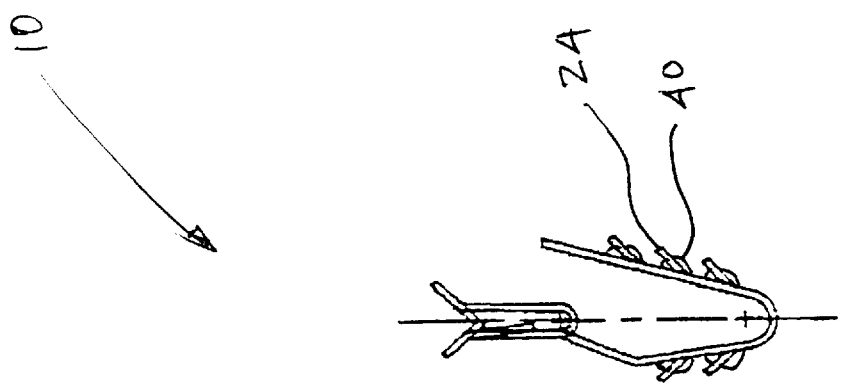
FIG. 7 is a schematic diagram showing a side view of a spring fastener according to still another preferred embodiment of this invention, wherein the spring fastener has a combination of outwardly extending ribs or embosses and barbs.

In still a different embodiment of the present invention, better shown in FIGS. 7 and 8, a combination if barbs 24 and ribs or embosses 40 may be used. The barbs 24 and the ribs or embosses 40 may be at the same or at different levels with respect to each other, depending on the particular circumstances. This embodiment is highly preferable because it unexpectedly provides considerably better performance than the other two embodiments.

The operation of this embodiment is substantially the same as the operation of the two aforementioned embodiments.

Examples of embodiments demonstrating the operation of the instant invention having now been given for illustration purposes only, and should not be construed as restricting the scope or limits of this invention in any way

What is claimed is:

1. A fastening device comprising in combination an assembly of a first clip and a second clip, the first clip integrally connected to the second clip, the first clip comprising inwardly extended barbs, or ribs or embosses, and the second clip comprising two sides and a structure comprising a bend and an array, the array selected from a group consisting of outwardly extended barbs, outwardly extended ribs or embosses, the outwardly extended ribs or embosses being parallel to the bend, and a combination thereof, the outwardly extended barbs, and/or outwardly extended ribs or embosses being engageable to an opening of a rigid sheet covered by a resilient sheet, thus securing the fastening device on the rigid sheet by an outwardly extended barb, and/or an outwardly extended rib or emboss which happens to be closest to and under the rigid sheet, thus allowing the fastening device to be engageable to the opening in a plurality of positions.

2. A fastening device as defined in claim 1, wherein the assembly of the first clip and the second clip are made of sheet metal having a thickness.

3. A fastening device as defined in claim 2, wherein the thickness of the sheet metal is in the range of 0.005" to 0.060".

4. A fastening device as defined in claim 3, wherein the first clip comprises two clip members disposed above the sides of the second clip.

5. A fastening device as defined in claim 4, wherein the first clip further comprises a flat portion disposed above the second clip and inbetween the two sides of the second clip.

6. A fastening device as defined in claim 2, wherein the first clip comprises two clip members disposed above the sides of the second clip.

7. A fastening device as defined in claim 6, wherein the first clip further comprises a flat portion disposed above the second clip and inbetween the two sides of the second clip.

8. A fastening device as defined in claim 1, wherein the first clip comprises two clip members disposed above the sides of the second clip.

9. A fastening device as defined in claim 8, wherein the first clip further comprises a flat portion disposed above the second clip and inbetween the two sides of the second clip.

* * * * *